(12) United States Patent
Oh et al.

(10) Patent No.: US 11,285,818 B2
(45) Date of Patent: Mar. 29, 2022

(54) DRIVING TORQUE COMMAND GENERATING APPARATUS AND METHOD OF ECO-FRIENDLY VEHICLE

(71) Applicants: Hyundai Motor Company, Seoul (KR); Kia Motors Corporation, Seoul (KR)

(72) Inventors: Ji Won Oh, Gyeonggi-do (KR); Jeong Soo Eo, Gyeonggi-do (KR); Sang Joon Kim, Seoul (KR); Lee Hyoung Cho, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 407 days.

(21) Appl. No.: 16/380,604

(22) Filed: Apr. 10, 2019

(65) Prior Publication Data

US 2019/0389317 A1    Dec. 26, 2019

(30) Foreign Application Priority Data

Jun. 22, 2018    (KR) .......................... 10-2018-0071892

(51) Int. Cl.
*B60L 15/20*  (2006.01)
*F16H 63/40*  (2006.01)

(52) U.S. Cl.
CPC ......... *B60L 15/20* (2013.01); *B60L 2240/423* (2013.01); *B60L 2260/44* (2013.01)

(58) Field of Classification Search
CPC .... B60L 15/20; B60L 50/60; B60L 2240/421; B60L 2240/423; B60L 2240/461;

(Continued)

(56) References Cited

U.S. PATENT DOCUMENTS 8,725,333 B2 *   5/2014   Akebono ........ B60W 30/18027
                                                      701/22
8,897,944 B2 *  11/2014   Takamura ............. B60L 3/0023
                                                      701/22

(Continued)

FOREIGN PATENT DOCUMENTS

KR         101448746 B1    10/2014
KR         101704243 B1     2/2017

OTHER PUBLICATIONS

The Engine Clutch Engagement Control for Hybrid Electric Vehicles; Jae Sung Bang;Seok Hwan Choi;Young Kwan Ko;Tae Soo Kim;Sangjoon Kim; 2018 IEEE Conference on Control Technology and Applications (CCTA); IEEE Conference Paper ; (Year: 2018).*

*Primary Examiner* — Cuong H Nguyen
(74) *Attorney, Agent, or Firm* — Mintz Levin Cohn Ferris Glovsky and Popeo, P.C.; Peter F. Corless

(57) ABSTRACT

A driving torque command generating apparatus and method of an eco-friendly vehicle are provided. The apparatus and method obtain rapid reaction and response of the vehicle in response to a driving input while effectively reducing NVH problems caused by torsion and backlash of a drive system even during a significant change in driving force caused by the driving input. Torsional state information of a vehicle drive system is obtained from input information regarding a motor speed and a wheel speed detected by a motor speed detector and a wheel speed detector. A motor torque command is generated based on a driving input value input by a driving input value detector and the obtained torsional state information.

17 Claims, 4 Drawing Sheets

(58) Field of Classification Search
CPC .......... B60L 2250/26; B60L 2270/145; B60L 2260/44; B60L 2250/28; Y02T 10/72; Y02T 10/70; Y02T 10/64
USPC .............. 701/22, 93; 73/115.08; 180/65.225, 180/65.28, 65.285
See application file for complete search history.

(56) References Cited

U.S. PATENT DOCUMENTS

| | | | |
|---|---|---|---|
| 2009/0042688 A1* | 2/2009 | Itou .................. | B60L 50/50 477/3 |
| 2009/0259354 A1* | 10/2009 | Krupadanam ........ | B60W 10/06 701/22 |
| 2011/0295457 A1* | 12/2011 | Linda .................. | B60W 40/068 701/498 |
| 2012/0109439 A1* | 5/2012 | Akebono ............. | B60W 20/40 701/22 |
| 2013/0304294 A1* | 11/2013 | Hosoe .................. | B60W 20/00 701/22 |
| 2014/0046527 A1* | 2/2014 | Ito ...................... | B60K 6/445 701/22 |
| 2014/0095006 A1* | 4/2014 | Saito .................. | B60L 53/35 701/22 |
| 2014/0195091 A1* | 7/2014 | Saito .................. | B60L 5/36 701/22 |
| 2014/0231160 A1* | 8/2014 | Makino ............... | B66F 9/07572 180/65.51 |
| 2017/0052208 A1* | 2/2017 | Reddy ................ | H02P 6/16 |
| 2020/0325983 A1* | 10/2020 | Shariatmadar ........ | G01P 13/04 |

* cited by examiner

DRIVING TORQUE COMMAND GENERATING APPARATUS AND METHOD OF ECO-FRIENDLY VEHICLE

CROSS REFERENCE TO RELATED APPLICATION

The present application claims priority to Korean Patent Application No. 10-2018-0071892, filed Jun. 22, 2018, the entire contents of which is incorporated herein for all purposes by this reference.

BACKGROUND

Field of the Disclosure

The present disclosure relates generally to a driving torque command generating apparatus and method and, more particularly, to a driving torque command generating apparatus and method of an eco-friendly vehicle that obtain rapid reaction and response of a vehicle in response to a driving input of a driver while effectively reducing noise, vibration, and harshness (NVH) problems caused by torsion and backlash of a drive system even when a significant change in driving force is caused by the driving input of the driver.

Description of the Related Art

As is well known in the art, eco-friendly vehicles, such as an electric vehicle (EV) and a hybrid electric vehicle (HEV), are propelled by electric motors. An electric vehicle is powered by an electric motor using energy stored in a battery, while a hybrid electric vehicle is powered by efficiently combining power from an engine and power from an electric motor. Other eco-friendly vehicles may include a fuel cell electric vehicle (FCEV) powered by an electric motor using electric power generated by fuel cells. An FCEV is also a vehicle powered by an electric motor, and may be categorized as a wide range of electric vehicles powered by electric motors, together with an EV and an HEV.

FIG. 1 is a view illustrating a system configuration of an electric vehicle (EV) according to the related art. As illustrated in FIG. 1, a drive motor (MG1) 13, a drive shaft, a transmission 14, and drive wheels are mechanically connected. In addition, an inverter 16 and a motor control unit (MCU) 17 are configured to operate the drive motor 13, a high-voltage battery 18 that supplies operating power to the drive motor 13, and a battery manage system (BMS) 19 configured to control and manage the battery 18 are provided.

The battery 18 operating as a power source of the vehicle is chargeably and dischargeably connected to the drive motor 13 via the inverter 16. The inverter 16 applies three-phase alternating current (AC), produced by transforming direct current (DC) supplied by the battery 18, to the drive motor 13 to operate the drive motor 13. The battery controller 19 is configured to collect battery status information, such as a voltage, a temperature, a state of charge (SOC, %) of the battery 18, and provide the battery status information collected to the other controllers within the vehicle or use the battery status information collected for charge/discharge control over the battery 18.

FIG. 2 is a view illustrating a system configuration of a hybrid electric vehicle (HEY) according to the related art, more particularly, a powertrain configuration in which a transmission 14 is disposed at an output side of a drive motor 13. As illustrated in FIG. 2, the system configuration includes an engine 11 and the drive motor 13 disposed in series as power sources for propelling the vehicle, an engine clutch 12 configured to connect or disconnect power between the engine 11 and the drive motor 13, a transmission 14 configured to transmit power from the engine 11 and the drive motor 13 to a drive shaft while by a speed conversion, a transmission 14 configured to perform a speed conversion while transmitting power from the engine 11 and the drive motor 13 to a drive shaft, and a starter-generator (MG2) 15 connected to the engine 11.

The engine clutch 12 connects or disconnects power between two driving sources, i.e. the engine and the drive motor 13, of the vehicle, through a closing or opening operation. In addition, the battery 18 operating as a power source of the vehicle is chargeably/dischargeably connected to the drive motor 13 and the starter-generator 15 via the inverter 16. The inverter 16 is configured to apply three-phase AC, produced by transforming DC supplied by the battery 18, to the drive motor 13 and the starter-generator 15 to operate the drive motor 13 and the starter-generator 15.

The starter-generator 15 is configured to perform a combined function of a starter motor and a generator. In particular, the starter-generator 15 is configured to start the engine 11 by transmitting power thereof to the engine 11 via a power transmission device (e.g. a belt or a pulley), generate electric energy using torque received from the engine, or charge the battery 18 with electric energy generated thereby. In addition, obtaining response of the vehicle in response to a driving input of the driver, such as manipulation of the accelerator pedal or the brake pedal, and reducing noise, vibration, and harshness (NVH) problems caused by a significant change in driving force are in a trade-off relationship.

In addition, gradient limitation and a filter having a variety of conditions as factors are used in eco-friendly vehicles to generate an optimum motor torque command able to remove the above-described trade-off relationship when assigning a level of driving force to a vehicle-driving source, for example, generating a torque command to a drive motor. In addition, in eco-friendly vehicles using a motor as a vehicle driving source or a portion of the vehicle driving source, a controller is configured to perform active feedback torque correction control to reduce already-generated vibration using the motor is used.

However, in such control technology, the number of process steps must be excessively increased to develop the controller. Recently, for driving-customized control according to driver's propensity, a driving force command is generated using a dual or diversified method, depending on a driving mode or conditions. In particular, the number of process steps may be significantly increased depending on diversified types, which is problematic.

As technique of the related art discloses a method of generating a model speed of a motor using a disturbance observer, and canceling vibration based on the difference between the model speed of the motor and an actual speed of the motor. In addition, in the method of generating the model speed of the motor, a method of substituting wheel speed-based calculation for the disturbance observer has been proposed.

However, the related art technique merely proposes a method of coping with vibration generated by disturbance, and does not propose a fundamental method of filtering command torque. Another technique of the related art discloses a method of generating a model speed of a motor using a model, and canceling vibration based on the difference between the model speed of the motor and an actual speed of the motor. However, this technique does not disclose a fundamental method of filtering command torque while merely disclosing a method of coping with vibration caused by disturbance.

Although both the related-art solutions as described above are intended to overcome NVH problems occurring in vehicles due to disturbance, none of the related-art solutions overcome NVH problems caused by a sudden vehicle manipulation or a driving input of the driver. In addition, since related-art solutions is intended to reduce vibration caused by disturbance, torque command generating strategy for each driving mode and propensity is not proposed The foregoing is intended merely to aid in the understanding of the background of the present disclosure, and is not intended to mean that the present disclosure falls within the purview of the related art that is already known to those skilled in the art.

SUMMARY

Accordingly, the present disclosure proposes a driving torque command generating apparatus and method of an eco-friendly vehicle that obtain rapid reaction and response of a vehicle in response to a driving input of a driver while effectively reducing noise, vibration, and harshness (NVH) problems caused by torsion and backlash of a drive system even when a significant change in driving force is caused by the driving input of the driver. The object of the present disclosure is not limited to the aforementioned description, and other objects not explicitly disclosed herein will be clearly understood by those skilled in the art to which the present disclosure pertains from the description provided hereinafter.

In order to achieve the above object, according to one aspect of the present disclosure, a driving torque command generating apparatus and method of an eco-friendly vehicle are provided. The apparatus may include: a driving input value detector configured to detect a driving input value of a driver, including a pedal input value in response to manipulation of an accelerator pedal; a motor speed detector configured to detect a motor speed of a drive motor of a vehicle; a wheel speed detector configured to detect a wheel speed of a wheel of the vehicle; and a controller configured to obtain torsional state information of a vehicle drive system from input information regarding the motor speed and the wheel speed detected by the motor speed detector and the wheel speed detector, and generate a motor torque command based on the driving input value input by the driving input value detector and the obtained torsional state information.

In order to achieve the above object, according to another aspect of the present disclosure, a driving torque command generating method of an eco-friendly vehicle may include: detecting, by a driving input value detector, a driving input value of a driver, including a pedal input value in response to manipulation of an accelerator pedal; detecting, by a motor speed detector, a motor speed of a drive motor of a vehicle; detecting, by a wheel speed detector, a wheel speed of a wheel of the vehicle; obtaining, by a controller, torsional state information of a vehicle drive system from input information regarding the motor speed and the wheel speed detected by the motor speed detector and the wheel speed detector; and generating, by the controller, a motor torque command based on the driving input value input by the driving input value detector and the obtained torsional state information.

According to the exemplary embodiments of the present disclosure, the driving torque command generating apparatus and method of an eco-friendly vehicle may obtain rapid reaction and response of a vehicle in response to the driving input of the driver while effectively reducing NVH problems caused by torsion and backlash of the drive system even when a significant change in driving force is caused by the driving input.

In addition, according to the exemplary embodiments of the present disclosure, when overcoming NVH problems caused by torsion and backlash of the drive system, it may be possible to overcome the difficulty in setting the torque command filter or torque gradient in a situation-specific manner by considering a number of factors, as well as the excessive number of process steps, which are the problems of the related-art solutions using the torque gradient control and the filter. In addition, since a torque command suitable for a specific point in time may be generated in real time, an improvement in efficiency may be expected.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
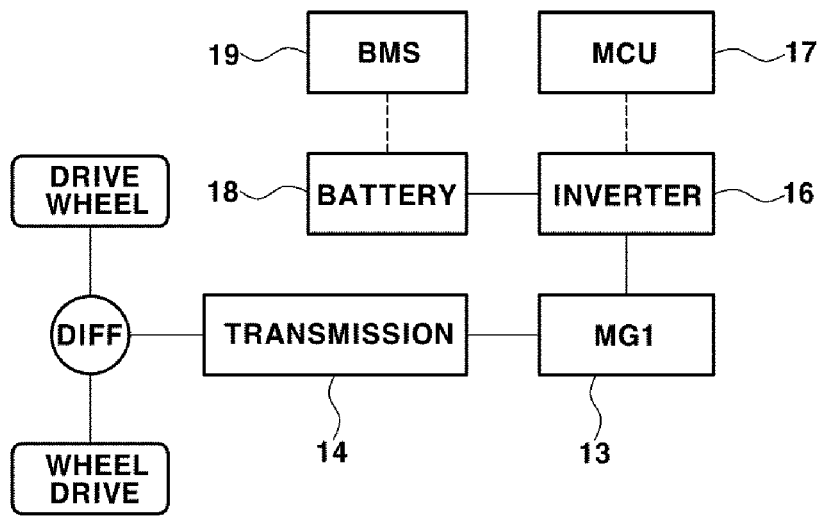
FIG. 1 is a view illustrating a system configuration of an EV according to the related art.
Figure 2:
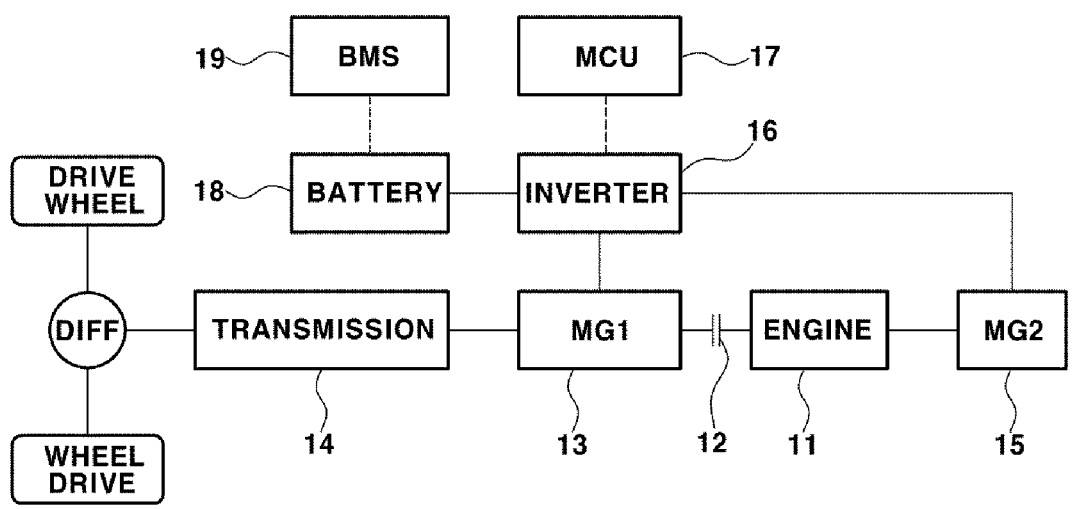
FIG. 2 is a view illustrating a system configuration of an HEV according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present disclosure will be described in detail with reference to the accompanying drawings so that a person having ordinary skill in the art to which the present disclosure relates could easily put the present disclosure into practice. However, the present disclosure is not limited to the exemplary embodiments described herein and may be embodied in other forms.

In an eco-friendly vehicle, a drive system including a vehicle drive source (i.e. an engine and a motor or a motor), a transmission (or a reducer), a drive shaft, and drive wheels may be regarded as rigid bodes integrally rotating. However, in the case of actual driving, torsion may occur in the drive system from the vehicle drive source to the drive wheels. In particular, torsion may occur in the drive system when a significant amount of driving torque is suddenly changed, for example, a driver suddenly engages the accelerator pedal or suddenly disengages the accelerator pedal.

Accordingly, during sudden manipulation of the vehicle by the driver or a sudden driving input of the driver (e.g. sudden manipulation of the accelerator pedal), vibration and noise may be generated due to torsion and backlash of the drive system. However, the related-art solutions merely overcome NVH problems caused by disturbance are unable to overcome NVH problems caused by sudden manipulation of the vehicle by the driver or a driving input of the driver.

A method of using gradient limitation and a filter having a variety of conditions as factors to generate an optimum driving force command (or a driving torque command) to overcome problems due to torsion of the drive system in eco-friendly vehicles has been known in the art. In the following description, the driving force command refers to a torque command to a driving source configured to propel or drive a vehicle, as well as a driving torque command for operating the driving source of the vehicle. For example, the driving force command refers to a torque command to a drive motor (hereinafter, referred to as a "motor").

Figure 3:
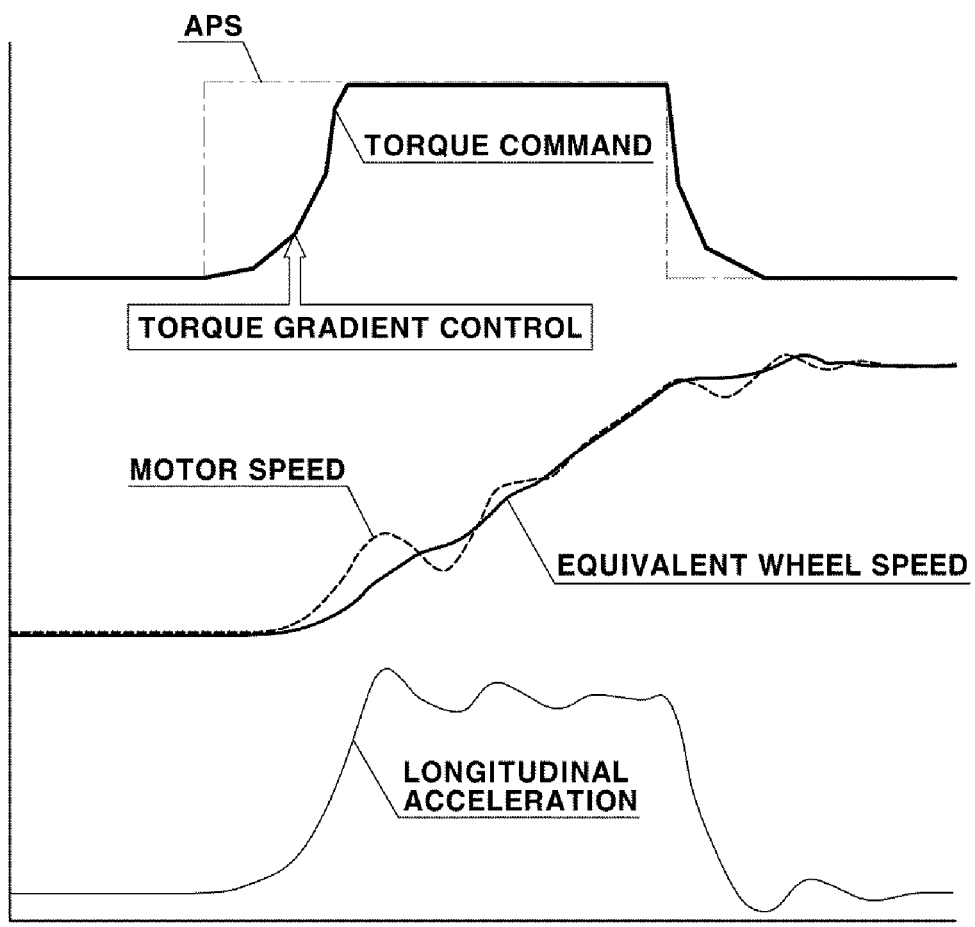
FIGS. 3 and 4 are views illustrating a known torque gradient control, i.e. a control method in which torque gradient limitation is performed according to the related art.
Figure 4:
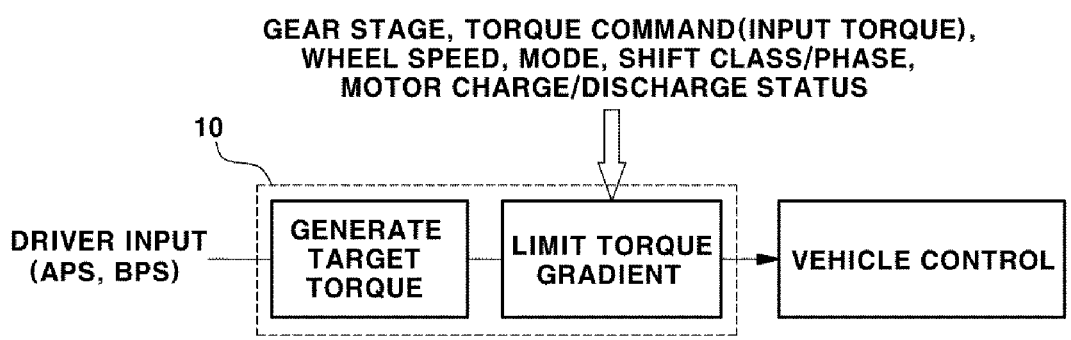

FIGS. 3 and 4 are views illustrating a known torque gradient control, i.e. a control method in which torque gradient limitation is performed according to the related art. In FIGS. 3 and 4, APS and BPS indicate an accelerator pedal sensor and a brake pedal sensor, respectively. As illustrated in FIG. 3, in a known method using torque gradient limitation, a torque gradient control is performed using a rate limiter to provide a gradual increase in a motor torque command even when a driver suddenly manipulates the accelerator pedal (i.e. even during a sudden increase in an APS signal).

However, even when the torque gradient control is performed, there may be a difference between a motor speed and an equivalent wheel speed (i.e. a speed obtained by multiplying a wheel speed with a motor-wheel gear ratio (i.e. a gear ratio between the drive motor and the drive wheels)) due to torsion of the drive shaft or the like. In addition, since the torque gradient control is performed, a gradually increasing motor torque command is generated, even during sudden engagement of the accelerator pedal by the driver. Consequently, since the operation of the motor is controlled by the gradually increasing torque command, a vehicle reaction of increasing acceleration (i.e. longitudinal acceleration) is slowed.

Referring to FIG. 4, a controller 10 is configured to operate the vehicle in response to user inputs via manipulation of an accelerator pedal or a brake pedal (e.g. an APS value and a BPS value). More particularly, when a target torque for controlling a motor torque output is determined, a rate limiter in the controller 10 is configured to limit the gradient of the motor torque command, depending on variables, such as a gear stage, a motor torque (or a torque command), a wheel speed, a mode, a shift class/phase, and a motor charge/discharge status.

Except for NVH problems caused by disturbances, backlash due to a gap in gear engagement or torsion of the drive shaft in the drive system leads to many NVH problems in the drive system. When the gradient of the torque command is adjusted such that the torque command gradually and minimally changes when the driver manipulates the accelerator pedal, the NVH problems in the drive system, due to the backlash or torsion, may be resolved to some extent. However, a gradual and minimal gradient change in torque may not provide a rapid response, thereby increasing the difference between a vehicle behavior desired by a driver and an actual vehicle behavior. This may cause a difference felt during acceleration or deceleration, thereby degrading drivability.

Referring to FIG. 3, even when the driver suddenly engages the accelerator pedal (i.e. sudden increase in the APS), the motor torque command increases at a gradual gradient and the vehicle acceleration (i.e. longitudinal acceleration) increases after a time delay after the engagement of the accelerator pedal. To overcome this trade-off relationship, in the related art, work of experimentally determining an optimum torque gradient value and an optimum filter constant to apply the torque gradient control and the filter has been required. At this time, the entirety of variables, such as a gear stage, a motor torque (or a torque command), a wheel speed, a mode, a shift class/phase, and a motor charge/discharge status, must be considered.

Accordingly, the present disclosure is intended to propose a method of generating a driving torque command by measuring torsion of the drive system to overcome the above-described problems, and thus, an optimum torque command for overcoming NVH problems may be generated in real time. In the drive system of an eco-friendly vehicle of the present disclosure, including the driving source of the vehicle, the transmission (or the reducer), and the drive shaft, the amount of the torsion of the drive system may be calculated based on measured values of a motor speed and a wheel speed, thus the motor torque command may be corrected by a function of the amount of the torsion, and the acceleration or deceleration of the vehicle may be performed according to the driver's demand.

Figure 5:
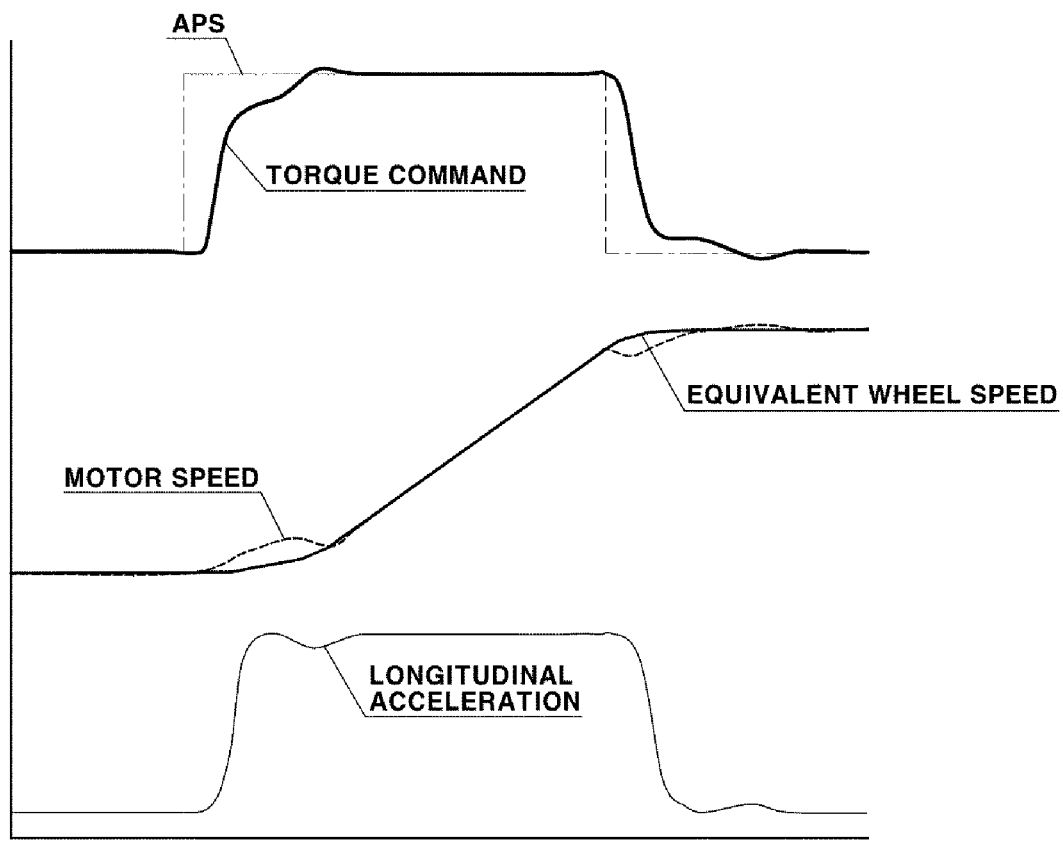
FIGS. 5 and 6 are views illustrating a feedback control method using a driving torque command generated according to an exemplary embodiment of the present disclosure.
Figure 6:
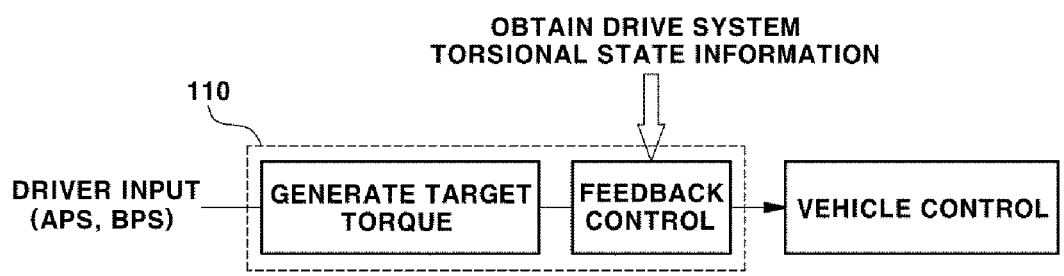
Figure 7:
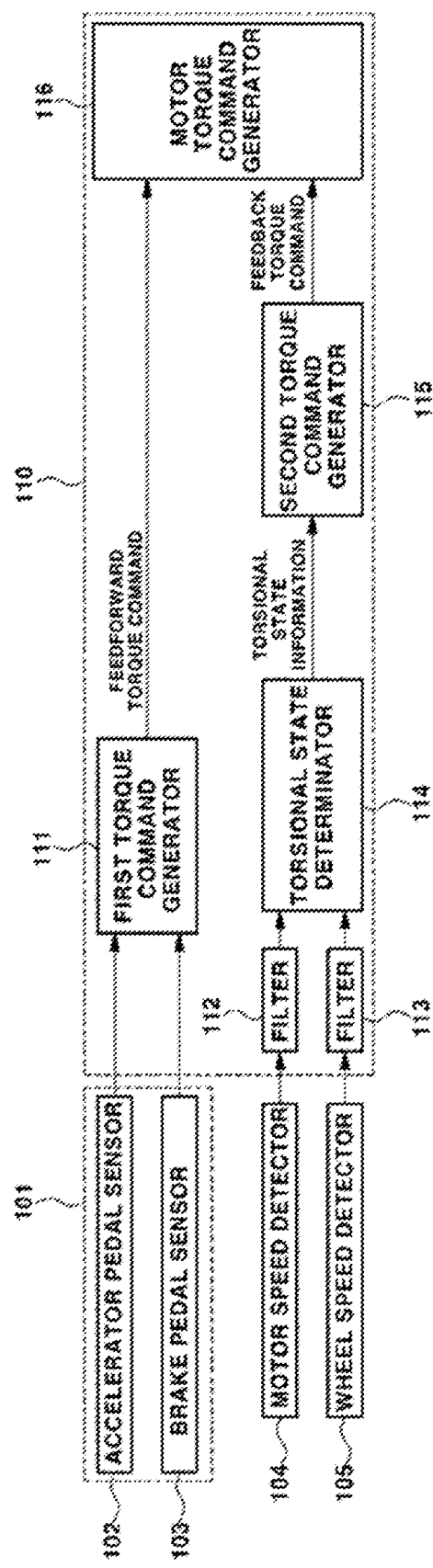
FIG. 7 is a block diagram illustrating a configuration of a driving torque command generating apparatus according to an exemplary embodiment of the present disclosure.

Hereinafter, a driving torque command generating apparatus and method according to the present disclosure will be described in detail with reference to the drawings FIGS. 5 and 6 are views illustrating a feedback control method using a driving torque command generated according to an exemplary embodiment of the present disclosure, and FIG. 7 is a block diagram illustrating a configuration of a driving torque command generating apparatus according to an exemplary embodiment of the present disclosure.

First, describing the configuration of driving torque command generating apparatus according to the present disclosure, the apparatus may include: a driving input value detector 101 configured to detect driving input values when the driver has input driving inputs to the vehicle; a motor speed detector 104 configured to detect a motor speed; a wheel speed detector 105 configured to detect a wheel speed; and a controller 110 configured to obtain torsional state information of the vehicle drive system from information regarding the motor speed and the wheel speed detected by the motor speed detector 104 and the wheel speed detector 105, and generate the driving torque command based on the driving input values detected by the driving input value detector 101 and the obtained torsional state information.

In particular, the driving input value detector 101 may be a typical accelerator pedal sensor (APS) 102 and a brake pedal sensor (BPS) 103, which are typical sensors configured to detect an accelerator pedal input value and a brake pedal input value of the driver. The driving input values are pedal input values in response to the manipulation of the accelerator pedal and the brake pedal by the driver (i.e. an APS signal value and a BPS signal value indicating pedal positions, displacements of pedal manipulation, and the like).

The motor speed detector 104 configured to detect the motor speed and the wheel speed detector 105 configured to detect the wheel speed may be a resolver disposed on a motor and a wheel speed sensor disposed on a wheel in a typical eco-friendly vehicle, respectively. In addition, the controller 110 may be a hybrid control unit (HCU) in the case of a hybrid electric vehicle (HEY), a vehicle control unit (VCU) in the case of an electric vehicle (EV), or a fuel cell system controller in the case of a fuel cell electric vehicle (FCEV).

The controller 110 may include a first torque command generator 111 configured to receive the driving input values of the driver (e.g. APS signal values and BPS signal values), detected by the driving input value detector 101. The first torque command generator 111 may be configured to generate a target torque command that corresponds to a target torque, with which the motor is to be operating, from the detected driving input values, and output the generated target torque command.

The controller 110 may further include a torsional state determinator 114 configured to determine the torsional state of the vehicle drive system from the information regarding the motor speed and the wheel speed detected by the motor speed detector 104 and the wheel speed detector 105, and output the torsional state information. The controller 110 may also include a second torque command generator 115 configured to generate and output a correcting torque command for reducing the torsion of the vehicle drive system, based on the torsional state information output by the torsional state determinator 114.

Additionally, the controller 110 may include a motor torque command generator 116 configured to generate a final motor torque command from the target torque command output by the first torque command generator 111 and the correcting torque command output by the second torque command generator 115. Particularly, the target torque command may be a feedforward torque command determined in a feedforward method, and the correcting torque command may be a feedback torque command determined in a feedback method.

Hereinafter, the target torque command, i.e. a torque command output by the first torque command generator 111, may be referral to as the feedforward torque command, and the correcting torque command, i.e. a torque command output by the second torque command generator 115, may be referred to as the feedback torque command. Accordingly, the first torque command generator 111 of the controller 110 may be configured to generate and output the feedforward torque command corresponding to the motor-controlling target torque that is applicable to the driving input, and the torsional state determinator 114 may be configured to determine the torsional state of the vehicle drive system from the information regarding the motor speed and the wheel speed detected in real time, and output the torsional state information. In addition, the second torque command generator 115 may be configured to generate and output the feedback torque command for reducing the torsion of the vehicle drive system, based on the torsional state information.

The motor torque command generator 116 of the controller 110 may be configured to generate the final motor torque command from the feedforward torque command output by the first torque command generator 111 and the feedback torque command output by the second torque command generator 115. Particularly, the motor torque command generator 116 may be configured to generate the final motor torque command by correcting the feedforward torque command by the feedback torque command intended for torsion reduction.

Hereinafter, the processes of generating the driving torque command will be described. When the driver manipulates the accelerator pedal or the brake pedal, the driving input value detector 101 may be configured to detect a driving input value according to the manipulation of the accelerator pedal or the brake pedal by the driver. The driving input value detected by the driving input value detector 101 may be input to the controller 110 in real-time.

During driving of the vehicle, the motor speed detector 104 and the wheel speed detector 105 may be configured to detect a motor speed and a wheel speed. The motor speed and the wheel speed detected by the motor speed detector 104 and the wheel speed detector 105 may be input to the controller 110 in real-time. In particular, the detected driving input value may be input to the first torque command generator 111 of the controller 110 to be used to generate the feedforward torque command. The motor speed and the wheel speed detected above may be input to the torsional state determinator 114 of the controller 110 to be used to determine torsional state of the drive system.

According to an exemplary embodiment of the present disclosure, the process of generating, by the first torque command generator 111, the feedforward torque command based on the driving input value of the driver is not different from the known method in which the controller generates a desired motor torque command according to a driving input value of a driver in a typical eco-friendly vehicle. Since the above-described method of generating the feedforward torque command by the first torque command generator 111 may be regarded as a technical feature known in the art, a detailed description thereof will be omitted herein.

The torsional state determinator 114 of the controller 110 may be configured to obtain torsional state information from the motor speed and the wheel speed, the wheel speed of the torsional state determinator 114 may be obtained based on the drive wheels of the vehicle. In addition, the wheel speed of the torsional state determinator 114 may be a value obtained by correcting a deviation between a left wheel and a right wheel or a deviation between a front wheel and a rear wheel and filtered by a filter 113, the filter 113 may be a low pass filter. For example, after a signal indicating an average speed of a left wheel speed and a right wheel speed or an average speed of a front wheel and a rear wheel is obtained, the signal of average speed may be filtered by the low pass filter 113, and then may be used to determine the torsional state. Similarly, the motor speed detected by the motor speed detector 104 may be also filtered by a filter 112, and a filtered value may be used in the torsional state determinator 114 of the controller 110. In particular, the filter 112 may be also the low pass filter.

Furthermore, as described above, the torsional state determinator 114 may be configured to determine the torsional state of the drive system from the motor speed and the wheel speed. According to the present disclosure, the torsional state information may include a torsional speed, a torsional acceleration, and a torsion angle. The torsional speed may be obtained by calculating difference between the motor speed and the wheel speed. To calculate the difference, the wheel speed compared with the motor speed may be an equivalent wheel speed in consideration of the gear ratio between the drive motor and the drive wheels.

In other words, the equivalent wheel speed may be calculated by multiplying the wheel speed detected by the wheel speed detector 105 with the motor-wheel gear ratio. In addition, when the torsional state determinator 114 calculates the difference between the motor speed and the equivalent wheel speed, the difference value calculated by the torsional state determinator 114 is a real-time torsional speed of the vehicle drive system. Particularly, when a vehicle includes an ordinary transmission having a fixed number of gear ratios, the motor-wheel gear ratio reflects a gear ratio of the transmission, i.e. the gear ratio of the current shift stage. The equivalent wheel speed is a wheel speed converted in consideration of the current shift stage of the transmission while being equivalent to the motor speed.

In addition, by the torsional state determinator 114, the torsional acceleration (i.e. torsional angular acceleration) may be calculated by differentiating the torsional speed (i.e. a torsional angular speed) calculated above, and the torsion angle may be calculated by integrating the torsional speed. The torsional speed, the torsional acceleration, and the torsion angle, which are calculated as described above, may be output as the torsional state information by the torsional state determinator 114, and input to the second torque command generator 115. Thus, the input information may be used to generate the feedback torque command by the second torque command generator 115.

The second torque command generator 115 may be configured to generate the feedback torque command that corresponds to the torsional state, based on the torsional speed, the torsional acceleration, and the torsion angle. In other words, the second torque command generator 115 may be configured to obtain a sum of the products obtained by multiplying each of the torsional speed, the torsional acceleration, and the torsion angle with the predetermined control gains, and set the sum as the feedback torque command.

Afterwards, the feedback torque command generated by the second torque command generator 115 may be transferred to the motor torque command generator 116. The motor torque command generator 116 may be configured to receive the feedforward torque command output by the first torque command generator 111 and the feedback torque command output by the second torque command generator 115, and generate the final motor torque command from the feedforward torque command and the feedback torque command input thereto. In particular, the motor torque command generator 116 may be configured to generate the motor torque command from a sum of the feedforward torque command and the feedback torque command. In other words, a sum may be obtained by adding the feedforward torque command determined based on the driving input values input by the driver and the feedback torque command determined based on the motor speed and the wheel speed measured in real-time, and the sum may be determined as the motor torque command.

In the present disclosure, for generating the motor torque command by adding the feedforward torque command and the feedback torque command as described above, the feedback torque command may be determined as a value in a direction in which the torsion of the drive shaft of the drive system may be reduced. For example, when the driving torque in a '+' direction is applied and the torsion in the '+' direction is generated, the feedback torque command may be determined in a '−' direction as an opposite direction of the driving torque of the motor and added.

In other words, as the torque command for the motor, the feedback torque command may be determined as a command for generating a motor torque in the direction in which, when the torsion of the drive system is generated, the torsion may be reduced. In addition, since the feedback torque command generated by the second torque command generator 115 should not exceed permissible load of the motor, the second torque command generator 115 may be set to limit to prevent the feedback torque command from exceeding the permissible load of the motor.

Similarly, since the feedforward torque command generated by the first torque command generator 111 should not exceed the permissible load of the motor, the first torque command generator 111 may also be set to limit so that the feedforward torque command does not exceed the permissible load of the motor. In addition, the final motor torque command obtained by adding the feedforward torque command and the feedback torque command may be also limited not to exceed the permissible load of the motor. Preferably, by the motor torque command generator, a maximum value of the motor torque command may be set in advance by the permissible load of the motor or a predetermined value less than the permissible load of the motor. Consequently, the motor torque command finally determined by the motor torque command generator 116 may be input to a motor control unit (MCU, not shown), and used by the motor control unit to operate the motor.

The driving torque command generating apparatus and method according to the present disclosure have been described as set forth above. According to the present disclosure, the feedback torque command may be generated in the above-described manner only when a wheel speed may be converted into a wheel speed from the point of view of the motor, i.e. an equivalent wheel speed. In particular, the feedback torque command may be generated only when a current gear ratio may be defined as a specific value without continuously varying.

In contrast, in a vehicle including an ordinary transmission having a fixed number of gear ratios, when the current shifting status corresponds to an actual transmission range (or in a shift inertia phase) or when a correct gear ratio is unable to be defined due to slip, such as creeping, the second torque command generator 115 may be configured to stop generation of the feedback torque command. Thus, when generation of the feedback torque command is stopped, since the feedback torque command is not output by the second torque command generator 115, the motor torque command generator 116 may be configured to determine the feedforward torque command input by first torque command generator 111 as the final motor torque command, and the operation of the motor may be executed only based on the feedforward torque command.

Additionally, according to a modified another exemplary embodiment of the present disclosure, the wheel speed of the drive wheels may be substituted with a wheel speed of non-drive wheels, a value of obtained by converting a vehicle speed obtained from global positioning system (GPS) into a wheel speed, or a wheel speed observed based on a model of the vehicle. For a hybrid vehicle, in which the engine and the motor are connected to be able to transmit power, for example, a transmission mounted electric device (TMED) type hybrid vehicle, the motor speed may be substituted with engine speed, a speed of hybrid-starter-and-generator (HSG), or a speed of an input shaft of the transmission.

Further, the method of generating the feedback torque command may change into torque command methods using the Kalman-filter technique or using the model based control with reference to the torsion of the shaft, in addition to the method of generating the feedback torque command by using the sum of the products obtained by multiplying each of the torsional speed, the torsional acceleration, and the torsion angle with the control gains. During a process of converting the equivalent wheel speed, conditions for determining when a steady gear ratio is unable to be defined may be substituted with other conditions, such as engagement/disengagement of the clutch, which may be determined using actuator information regarding the engine clutch or the transmission clutch, in addition to the above-described shifting and creeping conditions.

As set forth above, according to exemplary embodiments of the present disclosure, the driving torque command generating apparatus and method of an eco-friendly vehicle may obtain rapid reaction and response of a vehicle in response to the driving input of the driver (e g manipulation of the accelerator pedal by the driver) while effectively reducing NVH problems caused by torsion and backlash of the drive system even when a significant change in driving force is caused by the driving input.

In addition, according to exemplary embodiments of the present disclosure, when overcoming NVH problems caused by torsion and backlash of the drive system, it may be possible to overcome the difficulty in setting the torque command filter or torque gradient in a situation-specific manner by considering a number of factors, as well as the excessive number of process steps, which are the problems of the related-art solutions using the torque gradient control and the filter. In addition, since a torque command suitable for a specific point in time may be generated in real-time, an improvement in efficiency may be expected.

Although the exemplary embodiments of the present disclosure have been described for illustrative purposes, the scope of the present disclosure is not limited thereto. It should be understood that those skilled in the art will appreciate various modifications and improvements without departing from the scope and spirit of the present disclosure as disclosed in the accompanying claims.

What is claimed is:

1. A driving torque command generating apparatus of an eco-friendly vehicle, comprising:
   a driving input value detector configured to detect a driving input value of a driver, including a pedal input value in response to manipulation of an accelerator pedal;
   a motor speed detector configured to detect a motor speed of a drive motor of a vehicle;
   a wheel speed detector configured to detect a wheel speed of a wheel of the vehicle; and
   a controller configured to obtain torsional state information of a vehicle drive system from input information regarding the motor speed and the wheel speed detected by the motor speed detector and the wheel speed detector, and generate a motor torque command based on the driving input value input by the driving input value detector and the obtained torsional state information to operate the vehicle accordingly,
   wherein the controller includes:
   a first torque command generator configured to generate and output a target torque command that corresponds to a drive motor-controlling target torque from the driving input value input by the driving input value detector;
   a torsion state determinator configured to generate and output the torsional state information by determining a torsional state of the vehicle drive system from input information regarding the motor speed and the wheel speed detected and input by the motor speed detector and the wheel speed detector;
   a second torque command generator configured to generator and output a correcting torque command for reducing torsion of the vehicle drive system, based on the torsional state information input by the torsional state determinator; and
   the motor torque command generator configured to generate a final motor torque command from the target torque command input by the first torque command generator and the correcting torque command input by the second torque command generator.

2. The apparatus according to claim 1, wherein the target torque command is a feedforward torque command determined in a feedforward method, and the correcting torque command is a feedback torque command determined in a feedback method.

3. The apparatus according to claim 1, wherein the motor torque command generator is configured to generate the motor torque command as a value obtained by correcting the target torque command by the torsion-reducing correcting torque command.

4. The apparatus according to claim 1, wherein the correcting torque command generated by the second torque command generator is a command for generating a drive motor torque in a direction able to reduce the torsion of the vehicle drive system, and the motor torque command generator is configured to determine the motor torque command as a value obtained by adding the target torque command and the correcting torque command.

5. The apparatus according to claim 1, wherein the target torque command generated by the first torque command generator, the correcting torque command generated by the second torque command generator, and the motor torque command generated by the motor torque command generator, are limited to a value that does not exceed permissible load of the drive motor.

6. The apparatus according to claim 1, wherein the torsional state determinator is configured to determine the torsional state of the vehicle drive system from the motor speed and the wheel speed detected by the motor speed detector and the wheel speed detector and filtered by filters.

7. The apparatus according to claim 1, wherein the torsional state information includes a torsional speed, a torsional acceleration, and a torsion angle, the torsional speed is calculated as a difference between the motor speed detected by the motor speed detector and an equivalent wheel speed obtained by multiplying the wheel speed detected by wheel speed detector with a motor-wheel gear ratio, the torsional acceleration is calculated by differentiating the torsional speed, and the torsion angle is calculated by integrating the torsional speed.

8. The apparatus according to claim 7, wherein the second torque command generator is configured to obtain a sum of products obtained by multiplying each of the torsional speed, the torsional acceleration, and the torsion angle input by the torsional state determinator with predetermined corresponding control gains, and generate the sum as the correcting torque command.

9. The apparatus according to claim 7, wherein the second torque command generator is configured to stop generation of the correcting torque command, when a shifting status of a transmission is in an actual transmission range or obtained during creeping of the vehicle, and the motor torque command generator is configured to determine the target torque command as the final motor torque command.

10. A driving torque command generating method of an eco-friendly vehicle, comprising:
    detecting, by a controller, a driving input value of a driver, including a pedal input value in response to manipulation of an accelerator pedal using a driving input value detector;
    detecting, by the controller, a motor speed of a drive motor of the vehicle using a motor speed detector;
    detecting, by the controller, a wheel speed of a wheel of the vehicle using a wheel speed detector;
    obtaining, by the controller, torsional state information of a vehicle drive system from input information regarding the motor speed and the wheel speed detected by the motor speed detector and the wheel speed detector; and
    generating, by the controller, a motor torque command based on the driving input value input by the driving input value detector and the obtained torsional state information,
    wherein generating the motor torque command by the controller includes;
    generating, by the controller, a target torque command that corresponds to a drive motor-controlling target torque that is applicable to the driving input value input by the driving input value detector;
    generating, by the controller, a correcting torque command for reducing torsion of the vehicle drive system, based on the obtained torsional state information; and
    generating, by the controller, a final motor torque command from the target torque command and the correcting torque command.

11. The method according to claim 10, wherein the target torque command is a feedforward torque command determined in a feedforward method, and the correcting torque command is a feedback torque command determined in a feedback method.

12. The method according to claim 10, wherein the torsional state information includes a torsional speed, a torsional acceleration, and a torsion angle, the torsional speed is calculated as a difference between the motor speed detected by the motor speed detector and an equivalent wheel speed obtained by multiplying the wheel speed detected by wheel speed detector with a motor-wheel gear ratio, the torsional acceleration is calculated by differentiating the torsional speed, and the torsion angle is calculated by integrating the torsional speed.

13. The method according to claim 10, wherein the motor torque command is generated as a value obtained by correcting the target torque command by the torsion-reducing correcting torque command.

14. The method according to claim 10, wherein the correcting torque command is a command for generating a drive motor torque in a direction able to reduce the torsion of the vehicle drive system.

15. The method according to claim 14, further comprising:
    determining, by the controller, the motor torque command as a value obtained by adding the target torque command and the correcting torque command.

16. The method according to claim 12, further comprising:
    stopping generation, by the controller, of the correcting torque command, when a shifting status of a transmission is in an actual transmission range or during creeping of the vehicle; and
    determining, by the controller, the target torque command as the final motor torque command.

17. The method according to claim 12, wherein a sum of products is obtained by multiplying each of the torsional speed, the torsional acceleration, and the torsion angle with predetermined corresponding control gains, and the sum is generated as the correcting torque command.

\* \* \* \* \*